United States Patent
Zimmer et al.

(10) Patent No.: US 7,497,240 B2
(45) Date of Patent: Mar. 3, 2009

(54) TIRE INCLUDING PROJECTIONS HAVING SIDES OF UNEQUAL LENGTH AND AN UNDERCUT EXTENDING BENEATH THE APEX

(75) Inventors: Rene Jean Zimmer, Howald (LU); Claude Ernest Felix Boes, Erpeldange (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 919 days.

(21) Appl. No.: 10/024,869

(22) Filed: Dec. 19, 2001

(65) Prior Publication Data

US 2003/0111150 A1 Jun. 19, 2003

(51) Int. Cl.
 *B60C 11/13* (2006.01)
(52) U.S. Cl. .............. 152/209.19; 152/209.21; 152/523; 156/123; 156/129; 264/326; 425/28.1
(58) Field of Classification Search ............ 152/209.19, 152/209.21, 523; 425/28.1, 35; 264/326; 156/116, 123, 128.1, 129; 244/130, 200
 See application file for complete search history.

(56) References Cited

U.S. PATENT DOCUMENTS

| | | | | |
|---|---|---|---|---|
| 2,210,177 A | | 8/1940 | Rader ..................... 152/330 |
| 2,268,344 A | | 12/1941 | Shesterkin ............... 152/209 |
| 3,523,661 A | * | 8/1970 | Rethorst ................... 244/199 |
| 4,180,290 A | * | 12/1979 | Drews ...................... 244/130 |
| 4,198,774 A | * | 4/1980 | Roberts et al. ............ 40/587 |
| 4,259,227 A | | 3/1981 | Ojakaar ................... 260/37 N |
| 4,284,302 A | * | 8/1981 | Drews ..................... 244/130 |
| 4,625,101 A | * | 11/1986 | Hinks et al. ............ 235/462.01 |
| 4,655,546 A | | 4/1987 | Nagasaka et al. ........... 350/99 |
| 4,706,910 A | | 11/1987 | Walsh et al. .............. 244/130 |
| 4,750,693 A | | 6/1988 | Löbert et al. ............. 244/200 |
| 4,865,271 A | | 9/1989 | Savill ..................... 244/130 |
| 4,965,421 A | * | 10/1990 | Epperson ................. 200/514 |
| 5,016,696 A | | 5/1991 | Bonko et al. ........... 152/290 B |

(Continued)

FOREIGN PATENT DOCUMENTS

EP 0544236 6/1993

(Continued)

OTHER PUBLICATIONS

Machine translation for Japan 6-040219.*

(Continued)

*Primary Examiner*—Steven D Maki
(74) *Attorney, Agent, or Firm*—Richard B. O'Planick

(57) ABSTRACT

The tire has a plurality of radially outer rubber components defining a radially outer surface (S1) exposed to fluids having a relative displacement with respect to the rotating tire. At least one radially outer component has projections, the projections being defined by first sides (2) and second sides (2') of unequal length. The first sides (2) have a greater length, delimiting therebetween an angle α ranging from 5° to 60° and forming at their intersection an apex (P). The projections protrude by a height (h) from the radially outer surface (S1) from which said first and second sides originate, the height (h) ranging from 0.2 to 100 micrometers. In more than 75% of the projections, any plane tangent to the first side (2) of the projection cuts the radially outer surface (S1) at an acute angle.

6 Claims, 4 Drawing Sheets

U.S. PATENT DOCUMENTS

| | | | | |
|---|---|---|---|---|
| 5,263,525 | A | * | 11/1993 | Yamashita ............... 152/523 |
| 5,378,271 | A | | 1/1995 | Arimoto et al. ............ 106/236 |
| 5,603,796 | A | * | 2/1997 | Baker .................... 156/272.8 |
| 5,645,660 | A | * | 7/1997 | Attinello et al. ............ 152/523 |
| 5,848,769 | A | * | 12/1998 | Fronek et al. ............... 244/130 |
| 6,147,151 | A | | 11/2000 | Fukumoto et al. .......... 525/447 |
| 6,253,815 | B1 | | 7/2001 | Kemp et al. ............... 152/523 |
| 6,415,835 | B1 | * | 7/2002 | Heinen ................. 152/209.21 |
| 2001/0032691 | A1 | | 10/2001 | Ohsawa ................ 152/209.18 |
| 2005/0270604 | A1 | * | 12/2005 | Drinkwater .................... 359/2 |

FOREIGN PATENT DOCUMENTS

| | | | |
|---|---|---|---|
| GB | 2363100 | | 12/2001 |
| JP | 57107823 | A | 7/1982 |
| JP | 3-57704 | * | 3/1991 |
| JP | 5208454 | A2 | 8/1993 |
| JP | 6-40219 | * | 2/1994 |
| JP | 6238771 | A2 | 8/1994 |
| JP | 9099712 | A2 | 4/1997 |
| JP | 9164809 | A2 | 6/1997 |
| JP | 11-59135 | * | 3/1999 |
| JP | 2002-36820 | | 2/2002 |

OTHER PUBLICATIONS

Webster's II New University Dictionary, p. 750, 1984.*
Patent Abstracts of Japan, Application No. 55183769.

* cited by examiner

TIRE INCLUDING PROJECTIONS HAVING SIDES OF UNEQUAL LENGTH AND AN UNDERCUT EXTENDING BENEATH THE APEX

FIELD OF THE INVENTION

The present invention relates to the field of tires having improved properties with regard to dirt- and water-repellence. The invention relates more specifically to rubber tires, molds for vulcanizing tires and processes for making such.

BACKGROUND OF THE INVENTION

In the automotive industry, dirt adhering on the tires poses a problem in the sense that the weight of the vehicle, the air resistance and the consumption of fuel are non-negligibly increased. Furthermore, in order to ensure an optimum safety level (efficient grip) and for aesthetic reasons (especially on the lettering of the tire), there is a need for removing the dirt (mud, small stones, . . . ) from the tires prior to a new ride.

Similarly, in the aerospace industry, dirt adhering to airplane tires must be washed away before the machine is allowed to start again. Another major problem in this field is that airplane tires accumulate considerable amounts of water during take-off and flight. At the low temperatures that are experienced in high altitudes, the water turns into the state of ice during flight. Consequently, in order to remove this ice after landing, a large amount of anti-icing products must be used, involving considerable time and labor.

Furthermore, it is well understood that tires of all kinds should be as water-repellent as possible in order to optimize water evacuation and minimize the risk of aquaplaning.

Efforts to reduce air resistance of objects in motion in order to achieve a reduction in fuel consumption have been disclosed for surfaces such as the metallic surface of an airplane. For example, U.S. Pat. No. 4,865,271 by Savill teaches to provide an aerodynamic or hydrodynamic surface with so-called "riblets" for reducing drag by modification of the turbulent boundary layer (this is the thin layer of air molecules that touches the surface of the object and causes friction). The riblets comprise flow-aligned elongate projections of small height.

U.S. Pat. No. 4,706,910 by Walsh et al. discloses a system of flow control devices which result in reduced skin friction on aerodynamic surfaces. The devices cause a breakup of large-scale disturbances in the boundary layer of the flow field by the use of longitudinal striations forming vee-shaped grooves.

Against this background, it is an object of the present invention to provide rubber tires having an improved dirt-repellence, whereby the weight of the tire and the air resistance, are reduced, and savings in fuel consumption are achieved.

It is another object of the invention to provide tires having a self-cleaning effect, thus improving their optical appearance and lowering the quantity of cleaning material that is required.

It is still another object of the invention to provide tires with improved water-repellence, whereby the risk of aquaplaning is reduced. In the special case of airplane tires less anti-icing products will further be required.

Still another object of the invention is to provide tires in which color shade special effects can be incorporated without having to use colors.

SUMMARY OF THE INVENTION

The invention provides rubber tires, molds for vulcanizing tires and processes for making such as defined in the appended claims.

The invention comprises a rubber tire comprising a plurality of radially outer rubber components, which components define a radially outer surface of the tire and are exposed to fluids having a relative displacement with respect to the rotating tire, at least one radially outer component comprising projections extending towards the outside thereof. The projections are defined by first sides and second sides of unequal length, the first sides having the greater length, delimiting therebetween an acute angle α ranging from 5° to 60°, and preferably from 20° to 45° and forming at their intersection an apex, which protrudes by a height from the radially outer surface $S_i$ from which the first and second sides originate. The radially outer surface $S_i$ (S1 to S6 in the description hereafter) is defined as following the radially most exterior surface of the tire bare of any projections according to the invention.

The height ranges from 0.2 to 100 micrometers. In more than 75% of the projections, and preferably in more than 95% of the projections, any plane tangent to the first (radially outer) side cuts the radially outer surface $S_i$ at an acute angle which is preferably comprised between 15° and 55°, more preferably between 25° and 45°. In case the apex is rounded off, such plane must be tangent to the first side of the projection at a height not exceeding 75% of the total height of the projection.

In other words, a tile-shaped three-dimensional pattern is formed on the radially outer tire surface such that a bisecting line cutting the apex of the projections intersects the radially outer surface $S_i$ at an angle ranging from 20° to 60°, preferably from 35° to 45°.

It has surprisingly been found that the minutely crenate pattern that is formed on the radially outer surface $S_i$ of the tire has the effect of preventing the dirt particles from adhering to the rubber. The latter have no opportunity to get caught in the part of the tire covered with the three-dimensional pattern, as the size of the dirt particles is relatively larger than the dimension of the micro-grooves thus formed.

Similarly, water molecules are retained to a much lesser extent on a surface that is provided with such a three-dimensional pattern (rough surface) than on a completely even (smooth) surface. As a consequence, in a rotating tire the water molecules are simply ejected from the micro-structure towards the outside, whereby the risk of aquaplaning of a tire having the three-dimensional pattern of the invention is reduced.

It is to be noted that in order to ensure optimum operation, the height and spacing of the projections and the angle defined between the two sides making up the projections have to be properly designed for the speed that is traveled.

In a preferred embodiment of the invention, said projections are delimited in the region of the apexes P by a curved line, such that the apexes are slightly rounded at their tops.

In one embodiment of the invention, said pattern is applied to the sidewall. This further provides the advantage of making it possible to incorporate optical effects into the tire in order to improve its optical appearance. Thus, it is for example possible to incorporate shade special effects into the tire without the need to use colors. Indeed, by using predetermined values of the angle of inclination α and by orienting the projections laterally relative to each other in a selected way, the reflection of the light can be selectively varied in the areas where a special design is to be achieved.

This does of course not preclude the possibility of using coloring materials additionally, or of dying the rubber components or of adding pigments. Additional colors may be applied by spray-applying them onto the tire component, whereby additional effects can be achieved.

Further preferred embodiments are described in the dependent claims. It is to be noted that combinations of the features described in each claim may be possible or desired.

The tire according to the invention may be manufactured in a mold, which is specifically adapted to form a tire having the above three-dimensional pattern.

The invention further provides a process of making a rubber tire as defined above, comprising the steps of:
 a) providing a tape with projections as defined above protruding from the surface of the tape,
 b) adhering the tape to a vulcanized radially outer rubber component of a rubber tire.

The invention further provides a process of making a rubber tire as defined The invention also provides a process of making a rubber tire as defined above by vulcanizing the tire in a mold which is adapted to form such a tire. This means that the negative of the above three-dimensional pattern may be carved into the mold by means of laser carving, laser sintering-remelting, laser etching, electroplating, synchrotronic radiation or any other method which is deemed suitable for carving this pattern.

The invention still further provides a process of making a rubber tire comprising the further step of texturing the tire with materials that can be cured by means of UV radiation.

DEFINITIONS

The first and second lateral "sides" as herein described are surfaces which can be flat or slightly curved. In the latter case, each side can be curved the same way. It is also conceivable that only one of the sides such as the first side of a projection is curved. The surfaces are preferably parabolic segments, with the tips of the parabolic segments pointing away from the direction of movement, i.e. pointing outward into the direction of the flow.

"Fluids" are understood to mean the flowing media which it is desired to evacuate. They can be liquid, viscous or gaseous, for example water, air or air/water carrying dirt. The flowing medium may also consist of solvents which are employed when the tire is in a cleaning process.

The projections extending from the rubber component form a minutely crenate pattern of micro-grooves on the flow surface of the tire. The "flow surface" of the tire is understood to mean the surface of the rubber component which is exposed to and faces the fluids which it is desired to evacuate.

"Tread" means a rubber or elastomeric component including that portion of the tire that comes into contact with the road under normal inflation and load.

"Sidewall" means that portion of a tire between the tread and the bead.

"Groove" means an elongated void area in a tread that may extend circumferentially or laterally about the tread in a straight, curved, or zig-zag manner.

BRIEF DESCRIPTION OF THE DRAWINGS

The invention will be described by way of example and with reference to the accompanying drawings in which.

DETAILED DESCRIPTION OF THE PREFERRED EMBODIMENTS

Figure 1:
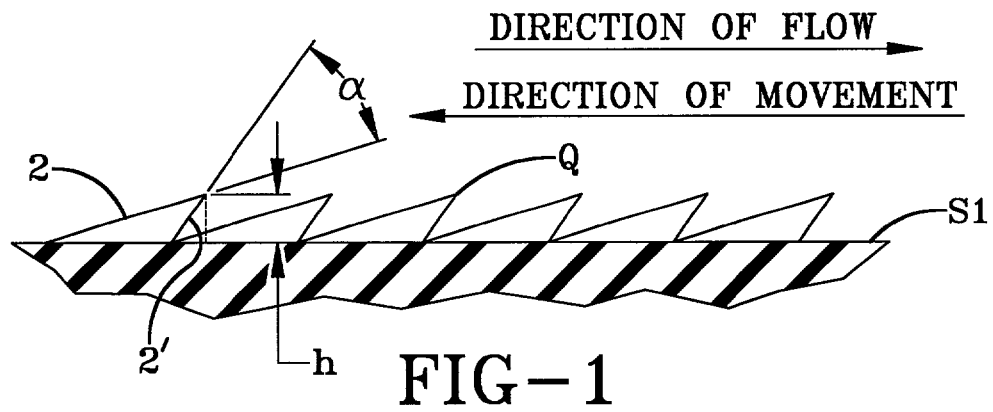
FIGS. 1-6 represent cross-sectional views of the outermost part of radially outer components according to different embodiments according to the invention.

Reference will be made in detail to preferred embodiments of the invention, examples of which are illustrated in the accompanying drawings. The drawings are intended to be illustrative, not limiting. Certain elements in selected ones of the drawings are not-to-scale, for illustrative clarity.

Similar elements throughout the drawings may be referred to by identical reference numerals. For example, the element 3 in a figure (or embodiment) may be similar in many respects to the element 3 in another figure (or embodiment). Such a relationship, if any, between similar elements in different figures or embodiments will become apparent throughout the specification, including, if applicable, in the claims and abstract.

FIG. 1 represents a cross-sectional view of a radially outer tire component provided with the projections according to the invention. The projections have first sides 2 and second sides 2' of unequal length protruding from a plane S1 delimiting the radially outer surface of the component. Extensions of rubbery material are thus formed. These first and second sides define at their intersection an angle α. Such angle has in the case of the drawing a value of 45° but may range in practice between 5° and 60°. Depending on the value of the angle α and the length of the lateral sides 2 and 2', the projections extend a distance h above the plane S1. This height h may range between 0.2 and 100 micrometers, and is in a preferred embodiment of the invention comprised between 1 and 50 micrometers and ranges in a most preferred embodiment between 1 and 15 micrometers. It is understood that depending on the location of the projections on the tire, e.g. on the sidewall or in the grooves of a tire tread, S1 is not a geometrical plane but is slightly curved, either laterally or perpendicular with respect to the drawing.

Figure 2:
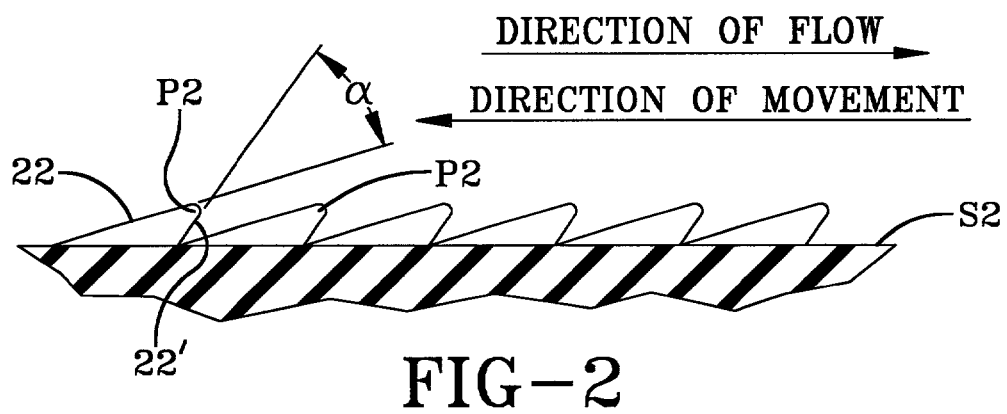

FIG. 2 represents a cross-sectional view of a radially outer tire component provided with the projections according to the invention, wherein the first and second sides 22 and 22' are delimited in the region of apexes P2 by a curved line.

Figure 3:
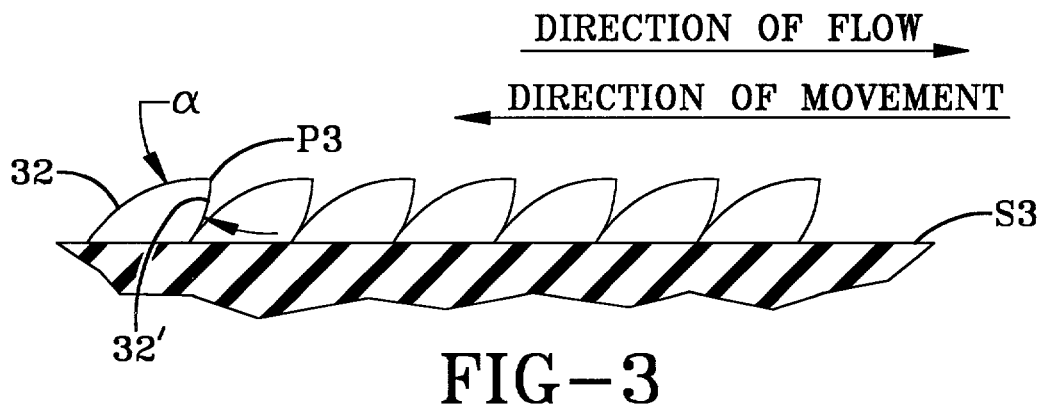

FIG. 3 represents a cross-sectional view of a radially outer tire component provided with the projections according to the invention, wherein the first and second sides 32 and 32' extend on their whole length with a slight curvature.

Figure 4:
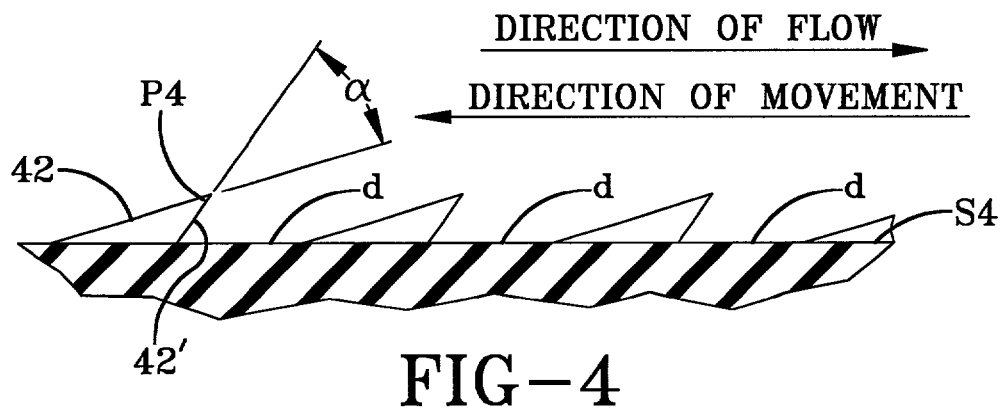

FIG. 4 represents a cross-sectional view of a radially outer tire component provided with the projections according to the invention, wherein the projections are placed at a distance d from each other. This distance d ranges between 0 and 100 micrometer and preferably between 0 and 15 micrometer.

Figure 5:
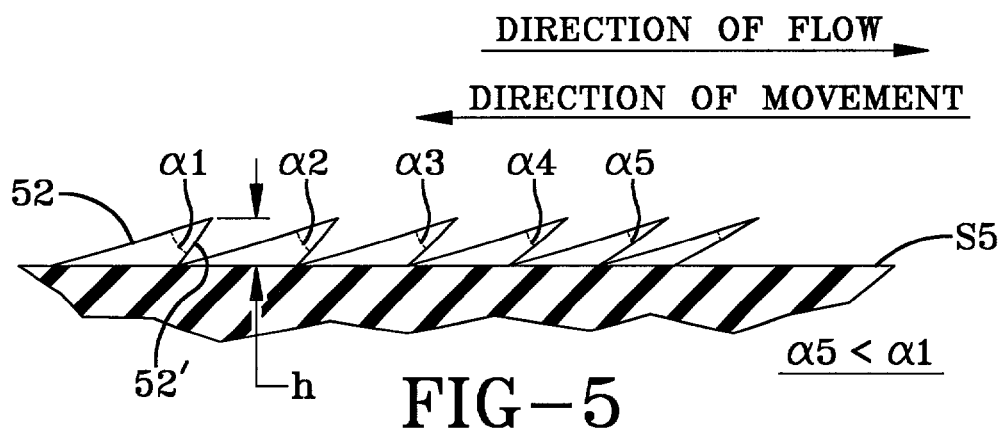

FIG. 5 represents a cross-sectional view of a radially outer tire component provided with the projections according the invention, wherein the first and second sides 52 and 52' define therebetween increasing angles α and extend on a constant height h above the plane S5. In the embodiment shown, angle $α_1$ is larger than angle $α_5$. The height h stays however constant. Such embodiment of the invention is of interest when the projections are located in the laterally extending curved groove of a tire tread where the fluid dynamics change transversely or longitudinally along the groove.

Figure 6:
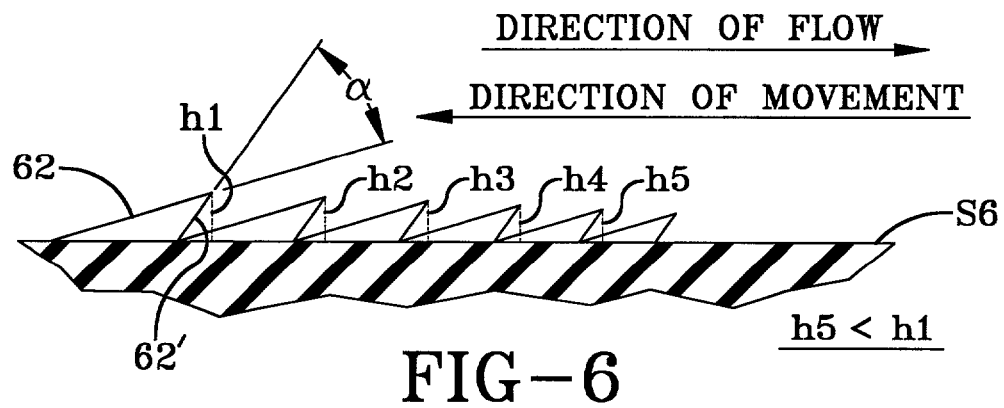

FIG. 6 represents a cross-sectional view of a radially outer component provided with the projections according to the invention, wherein the projections extend on a decreasing height h above the plane S6. In the embodiment shown, height h5 is smaller than h1.

Figure 7:
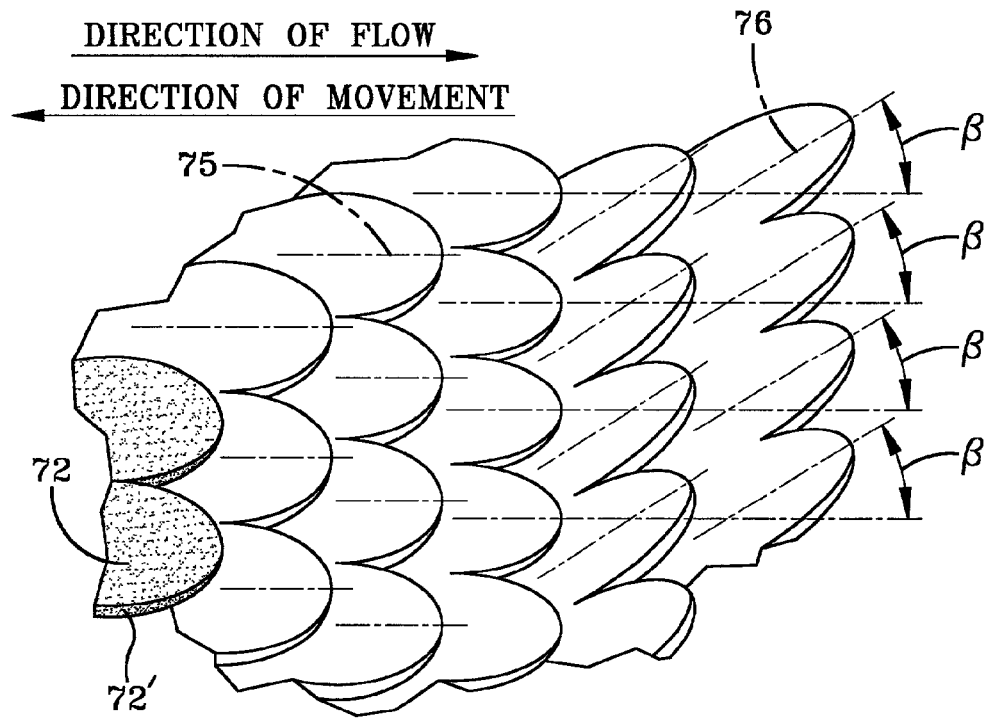
FIG. 7 shows a top view of an arrangement of projections according to the invention.

FIG. 7 represents a top view of an arrangement of projections according to the invention, for instance in the bottom of a circumferentially extending groove, wherein, within the same plane, the projections placed on the radially outer component have central longitudinal axes 75 respectively 76 varying with respect to each other by a small angle β. Including these projections into the bottom of a circumferentially extending tread groove, the central longitudinal axis of a projection may be parallel to or form a small angle with the groove middle line.

Figure 8A:
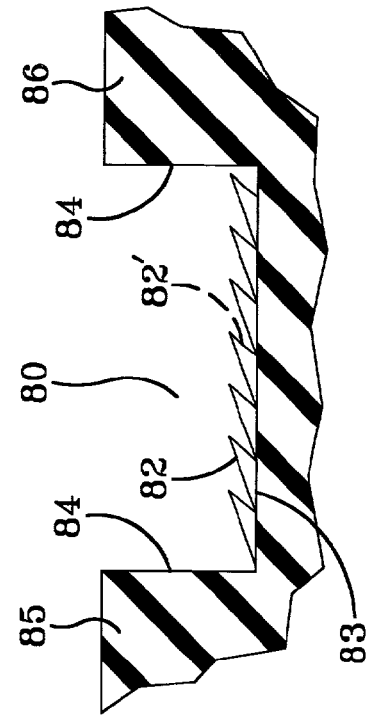
FIG. 8A-D show different cross-sectional views of a groove of a tire tread provided on portions thereof with the projections according to the invention.
Figure 8B:
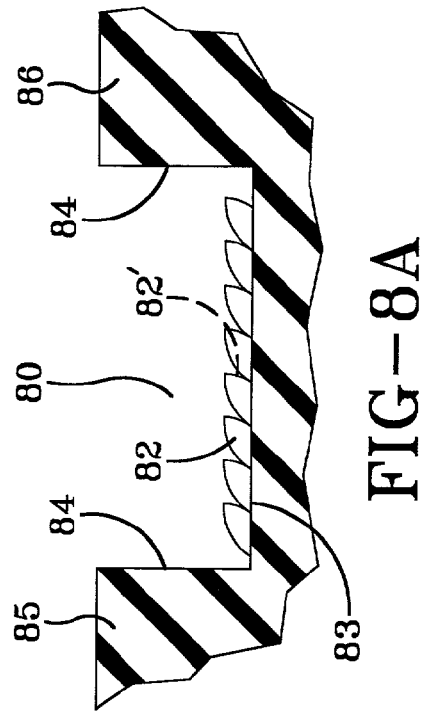
Figure 8C:
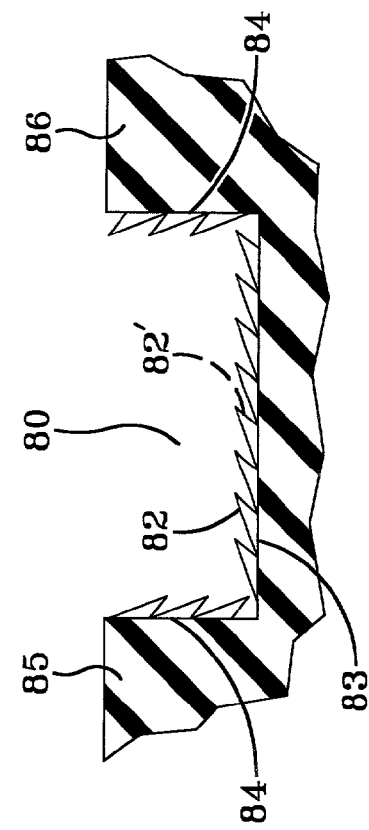
Figure 8D:
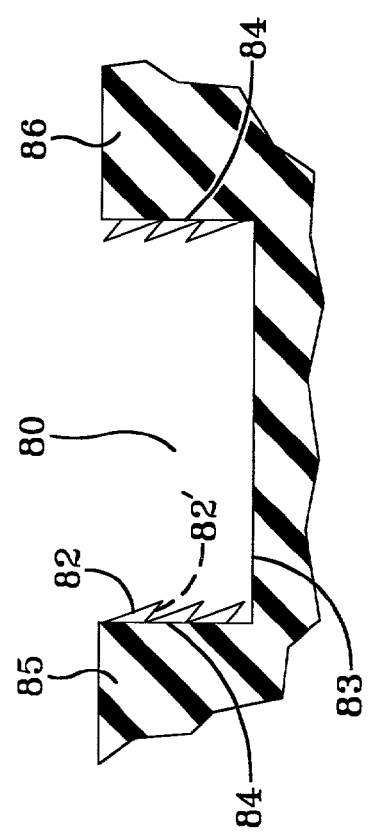

FIGS. 8A-D represent four transverse cross-sectional views of a tread groove 80 defined by two neighboring block or rib portions of rubbery material 85 and 86 having lateral walls 84. In FIG. 8A and 8B the projections are provided on the bottom 83 of the tread groove 80; in FIG. 8A the projections have substantially curved lateral sides 82 and 82', whereas in FIG. 8B, the lateral sides 82 and 82' are straight; in FIG. 8C the projections are provided on the lateral walls 84 of the tread groove 80; in FIG. 8D the projections are provided both on the bottom 83 and on the lateral walls 84 of the tread groove 80. Attention is drawn to the fact that the relative dimensions of the projections to the tread grooves are for explanatory purposes not correct. The tread grooves have lateral and vertical dimensions (groove width and groove depth) in the millimeter range whereas the projections have, as said above, dimensions in the micrometer range.

The groove portions 80 represented in FIGS. 8A-D are understood as being parallel to the axis of rotation of the tire, and more specifically in a rotating tire, the block or rib portions 85 contact the ground before block of rib portions 86.

Figure 9:
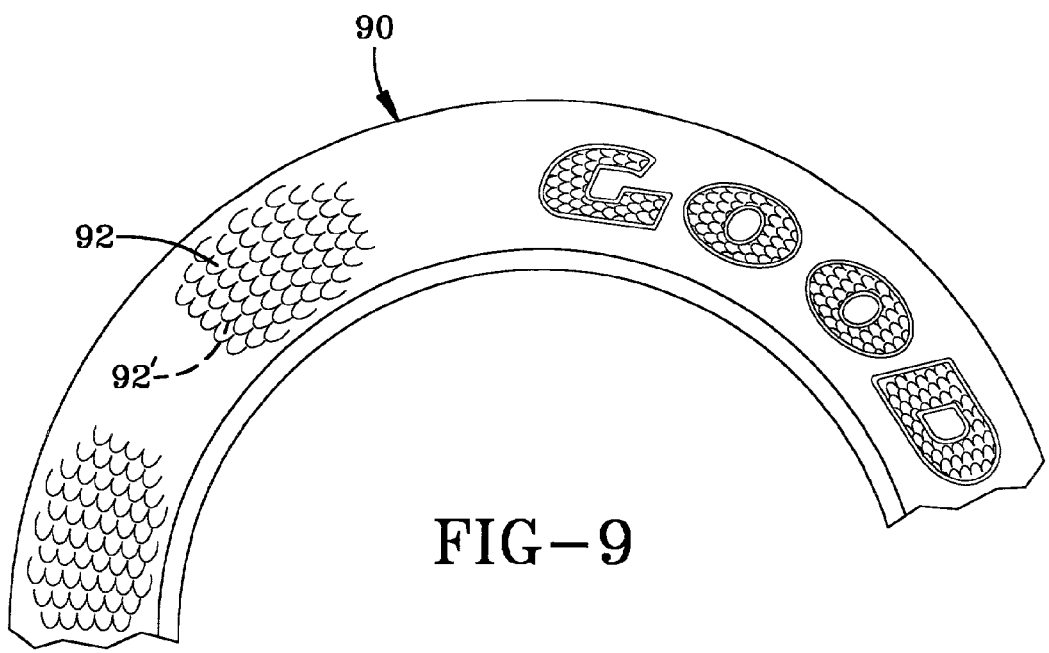
FIG. 9 shows a side view of a tire provided on parts of its sidewall with the projections according to the invention.

FIG. 9 shows a side-view of a pneumatic tire provided on portions of the sidewall with the projections according to the invention. The projections extend substantially circumferentially along the sidewall as well as along the letter G of the lettering.

INDUSTRIAL APPLICATION

FIG. 9 shows a side-view of a pneumatic tire provided on portions of the The advantages resulting from an application of the invention should become clear from the above description. Moreover, it should be noted that the invention also opens up new possibilities for using rubber in industry. Indeed, it is often not possible or not advisable to use rubber in industrial applications of any kind because of the inherent tendency of rubber to accumulate dirt. The instant invention presents in particular a novel way to keep rubber clean, which could encourage its use for various industrial applications.

The invention may be applied to a rubber article having an outer component that is exposed to fluids such as air, water or solvents having a relative displacement with respect to the outer component of the rubber article in motion, wherein said at least one outer component comprises the above described projections. In this way, the properties of the article with respect to dirt- or water-repellence are improved. This article is for example a rubber shoe or boot or the rubber sole of same, without being limited to these examples.

What is claimed is:

1. A tire having a plurality of radially outer rubber components, the components defining a radially outer surface (S1) of the tire and being exposed to fluids having a relative displacement with respect to the rotating tire, the tire comprising at least one radially outer component having projections, the projections being defined by first sides (2) and second sides (2') of unequal length, the first sides (2) having the greater length, delimiting therebetween an angle α ranging from 5° to 60° and forming at their intersection an apex (P), which protrudes by a height (h) from the radially outer surface (S1) from which said first and second sides originate, the second side (2') forming with the outer surface (S1) an undercut extending beneath the apex (P), and the height (h) ranging from 0.2 to 100 micrometers and in more than 75% of the projections, any plane tangent to the first side (2) of the projection cutting the radially outer surface (S1) at an acute angle and wherein said at least one radially outer rubber component is a tread.

2. The tire according to claim 1, wherein said projections are provided on the bottom of at least one groove provided in the tread.

3. The tire according to claim 1, wherein said projections are provided on at least one sidewall of at least one groove of the tread.

4. The tire according to claim 3, wherein said at least one groove is a circumferentially extending groove.

5. A tire having a plurality of radially outer rubber components, the components defining a radially outer surface (S1) of the tire and being exposed to fluids having a relative displacement with respect to the rotating tire, the tire comprising at least one radially outer component having projections, the projections being defined by first sides (2) and second sides (2') of unequal length, the first sides (2) having the greater length, delimiting therebetween an angle α ranging from 5° to 60° and forming at their intersection an apex (P), which protrudes by a height (h) from the radially outer surface (S1) from which said first and second sides originate, the second side (2') forming with the outer surface (S1) an undercut extending beneath the apex (P), and the height (h) ranging from 0.2 to 100 micrometers and in more than 75% of the projections, any plane tangent to the first side (2) of the projection cutting the radially outer surface (S1) at an acute angle and wherein said projections are delimited in the region of apexes (P) by a curved line.

6. A tire according to claim 5, wherein said plane cutting the radially outer surface at an acute angle is tangent to the first side (2) of the projection at a height not exceeding 75% of the total height of the projection.

* * * * *